US009861966B2

(12) United States Patent
Watanabe

(10) Patent No.: US 9,861,966 B2
(45) Date of Patent: Jan. 9, 2018

(54) CATALYTIC CRACKING CATALYST, PROCESS FOR PRODUCING THE SAME, AND METHOD OF CATALYTIC CRACKING OF HYDROCARBON OIL

(75) Inventor: Katsuya Watanabe, Satte (JP)

(73) Assignees: COSMO OIL CO., LTD., Tokyo (JP); PETROLEUM ENERGY CENTER, Tokyo (JP)

( * ) Notice: Subject to any disclaimer, the term of this patent is extended or adjusted under 35 U.S.C. 154(b) by 950 days.

(21) Appl. No.: 12/293,597

(22) PCT Filed: Mar. 2, 2007

(86) PCT No.: PCT/JP2007/054066
§ 371 (c)(1),
(2), (4) Date: Sep. 19, 2008

(87) PCT Pub. No.: WO2007/108297
PCT Pub. Date: Sep. 27, 2007

(65) Prior Publication Data
US 2010/0236983 A1    Sep. 23, 2010

(30) Foreign Application Priority Data
Mar. 22, 2006   (JP) ................................. 2006-079209

(51) Int. Cl.
*B01J 21/00* (2006.01)
*B01J 29/06* (2006.01)
(Continued)

(52) U.S. Cl.
CPC ............. *B01J 29/06* (2013.01); *B01J 29/088* (2013.01); *B01J 35/002* (2013.01); *C10G 11/05* (2013.01);
(Continued)

(58) Field of Classification Search
CPC ........ B01J 2229/42; B01J 23/02; B01J 23/04; B01J 23/10; B01J 29/06; B01J 29/088;
(Continued)

(56) References Cited

U.S. PATENT DOCUMENTS

2004/0053773 A1   3/2004  Sarkar et al.
2005/0232839 A1  10/2005  Yaluris et al.

FOREIGN PATENT DOCUMENTS

EP    0 236 548 A1    9/1987
EP     0583025 A1    2/1994
(Continued)

OTHER PUBLICATIONS

JP 10-195453, Jul. 1998, Watanabe, machine tranlsation.*
(Continued)

*Primary Examiner* — Melvin C Mayes
*Assistant Examiner* — Smita Patel
(74) *Attorney, Agent, or Firm* — Sughrue Mion, PLLC

(57) ABSTRACT

A catalytic cracking catalyst is provided which has high cracking activity and with which the production of FCC gasoline having a high octane number can efficiently proceed without lowering a gasoline yield. Also provided are a process for producing the catalyst and a method of the catalytic cracking of a hydrocarbon oil with the catalyst. The catalyst for catalytic cracking of a hydrocarbon oil comprises a crystalline aluminosilicate, a binder, and a clay mineral in a certain proportion, wherein the content of sodium and potassium therein is 0.5% by mass or lower in terms of oxide ($Na_2O$ and $K_2O$) amount, the content of at least one rare earth metal therein is 3.0% by mass or lower in terms of oxide ($RE_2O_3$, wherein RE is a rare earth element) amount, the [$RE_2O_3+Na_2O+K_2O$]/[crystalline aluminosilicate] ratio by mass is 0.1 or lower, and the catalyst has a xenon adsorption amount, as measured at an adsorp- (Continued)

tion temperature of 25° C. and a partial xenon pressure of 650 torr, of $2.20 \times 10^{20}$ molecules or more per g of the catalyst. Also provided are a process for producing the catalyst and a method of catalytic cracking of a hydrocarbon oil with the catalyst.

3 Claims, 1 Drawing Sheet

(51) Int. Cl.
*B01J 29/08* (2006.01)
*B01J 35/00* (2006.01)
*C10G 11/05* (2006.01)
*B01J 21/16* (2006.01)

(52) U.S. Cl.
CPC ............ *B01J 21/16* (2013.01); *B01J 2229/42* (2013.01); *C10G 2400/02* (2013.01)

(58) Field of Classification Search
CPC ........ B01J 35/0002; B01J 21/16; B01J 21/00; C10G 11/05; C10G 2400/02
See application file for complete search history.

(56) References Cited

FOREIGN PATENT DOCUMENTS

| | | |
|---|---|---|
| GB | 2 345 293 A | 7/2000 |
| JP | 61-82845 A | 4/1986 |
| JP | 62-191046 A | 8/1987 |
| JP | 1-123637 A | 5/1989 |
| JP | 4-59616 A | 2/1992 |
| JP | 10-195453 A | 7/1998 |
| JP | 10-195454 A | 7/1998 |
| JP | 11-156197 A | 6/1999 |
| JP | 2000-198989 A | 7/2000 |

OTHER PUBLICATIONS

NPL: Cocking and regeneration of fluid cracking catalysts by 129Xe and 27 AI Nuclear Magnetic Resonance Spectroscopy, Chapter 18, Bonardet et al., Fluid catalytic cracking III—American chemical society, 1994, pp. 230-240.*
Chinese Office Action issued in Application No. 200780009985.2 dated Jan. 18, 2011.
Chinese Office Action dated Apr. 28, 2010 in corresponding Chinese Application No. 200780009985.2.
Japanese Office Action dated Nov. 30, 2011, issued in counterpart Japanese Application No. 2006-079209.
Office Action dated Mar. 7, 2012 in Chinese Patent Application No. 200780009985.2.
Communication from the Canadian Patent Office dated May 13, 2013 in Canadian Application No. 2,643,099.
International Preliminary Report on Patentability for PCT/JP2007/054066 dated Oct. 21, 2008 [PCT/IB/373].
Office Action issued by the Canadian Intellectual Patent Office in Canadian Patent Application No. 2,643,099 dated Jan. 21, 2014.
Office Action dated Aug. 28, 2013 issued by the Korean Intellectual Property Office in Korean Patent Application No. 10-2008-7022973.
First Examination Report dated Nov. 19, 2013, issued by the Indian Patent Office in Indian Application No. 7094/DELNP/2008.
Communication dated Jul. 30, 2012 issued by the European Patent Office in European Application No. 07715160.3.
Communication dated Sep. 15, 2017, issued by the European Patent Office in counterpart European Patent Application No. 07715160.3.

* cited by examiner

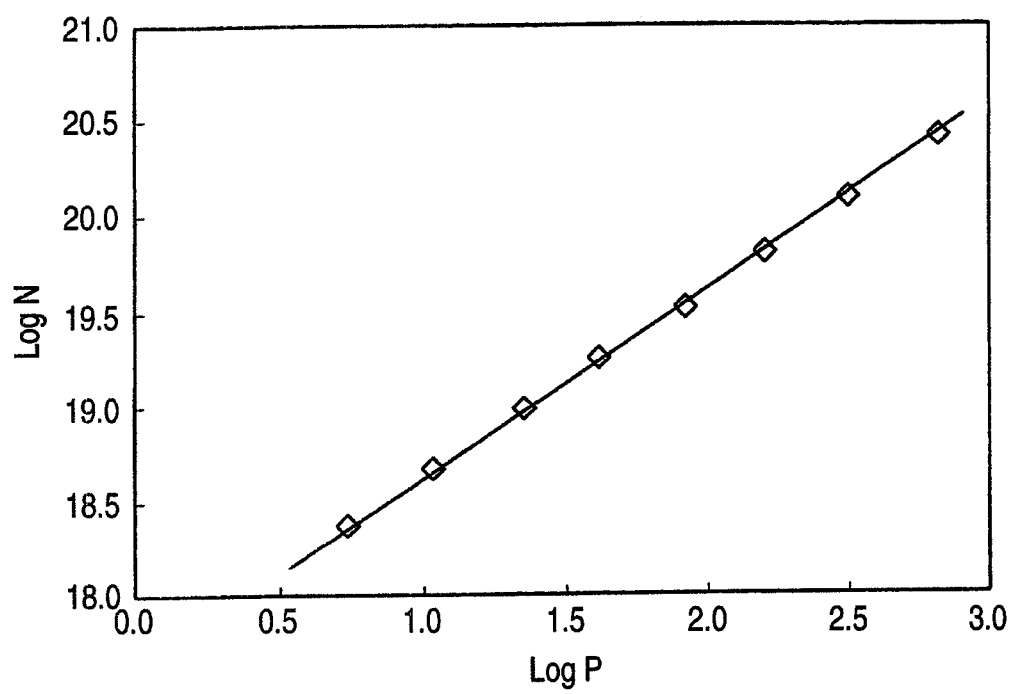

US 9,861,966 B2

CATALYTIC CRACKING CATALYST, PROCESS FOR PRODUCING THE SAME, AND METHOD OF CATALYTIC CRACKING OF HYDROCARBON OIL

TECHNICAL FIELD

The present invention relates to a catalyst for catalytic cracking of a hydrocarbon oil, a process for producing the catalyst, and catalytic cracking process of a hydrocarbon oil with the catalyst. More particularly, the invention relates to a catalytic cracking catalyst which has high cracking activity in the fluid catalytic cracking (hereinafter often referred to as "FCC") of a hydrocarbon oil and which enables the gasoline fraction obtained by the cracking reaction (hereinafter often referred to as "FCC gasoline") to have a heightened octane number without reducing the yield thereof, and to a process for producing this catalyst and a method of catalytic cracking of a hydrocarbon oil with the catalyst.

BACKGROUND ART

Recently, the consciousness of global-environment preservation has risen and measures against the warming effect have become important. In particular, automobile exhaust gases exert considerable influences on the environment and it is expected to clean the gases. It is generally known that to clean automobile exhaust gases is influenced by the performance of the motor vehicles and the composition of the gasoline fuel. The petroleum refining industry is especially required to provide a high-quality gasoline capable of contributing to automobile exhaust gas cleaning.

A gasoline is produced by blending gasoline blend-stocks obtained in crude oil refining steps. In particular, the FCC gasoline which is obtained by the catalytic cracking reaction of a heavy hydrocarbon oil is incorporated into gasolines in large quantities and exert a considerable influence on gasoline quality improvements.

The catalytic cracking of a heavy hydrocarbon oil is a reaction in which a heavy oil, which is a low-quality oil obtained in a petroleum refining step, is catalytically cracked to thereby convert it into a light hydrocarbon oil. However, hydrogen, coke, liquid petroleum gas (LPG), lighter fractions (light cycle oil: LCO), and heavy fraction (heavy cycle oil: HCO) are yielded as by-products in producing FCC gasoline. For efficiently producing FCC gasoline, persons skilled in the art prefer a catalyst which has high cracking activity and with which a high-quality gasoline having a high octane number is obtained in a high gasoline yield.

A method for obtaining high-quality FCC gasoline has been proposed in which a high-silica zeolite which has the high acidity, e.g., ZSM-5, is added to a catalyst to yield FCC gasoline having an increased light-olefin content and an improved octane number (see, for example, patent document 1). This method, however, has had a disadvantage that the yield of the FCC gasoline decreases. Furthermore, a method of catalytic cracking in which a heavy oil is converted to a light olefin fraction and FCC gasoline having a high octane number has also been proposed (see, for example, patent document 2). This method has a problem that coke deposits on the catalyst in an increased amount although the amount of olefins serving to heighten the octane number increases.
Patent Document 1: JP-A-61-82845

Patent Document 2: JP-A-10-195454

DISCLOSURE OF THE INVENTION

Problems that the Invention is to Solve

Under the circumstances described above, an object of the invention is to provide a catalytic cracking catalyst which has high cracking activity in the catalytic cracking of a hydrocarbon oil and with which the production of FCC gasoline having a high octane number can efficiently proceed without lowering an FCC gasoline yield. Another object of the invention is to provide a process for producing the catalytic cracking catalyst and a method of the catalytic cracking of a hydrocarbon oil with the catalyst.

Means for Solving the Problems

The present inventors made intensive investigations in order to accomplish those objects. As a result, they have found that when a catalyst which is an FCC catalyst comprising a crystalline aluminosilicate, a binder, and a clay mineral as components has such specific properties that the content of sodium and potassium and the content of a rare earth metal in the catalyst are lower than certain values, the $[RE_2O_3+Na_2O+K_2O]/$[crystalline aluminosilicate] ratio by mass is not larger than a certain value, and the catalyst has a regulated xenon adsorption amount, then it has high cracking activity in the catalytic cracking reactions of hydrocarbon oils and enables FCC gasoline having a high octane number to be efficiently produced. The invention has been thus completed.

Namely, the invention provides the following catalyst for the catalytic cracking of a hydrocarbon oil, process for producing the catalyst, and method of catalytic cracking of hydrocarbon oil with the catalyst.

(1) A catalyst for catalytic cracking of a hydrocarbon oil, which comprises 20-50 mass % of crystalline aluminosilicate, 5-40 mass % of binder, and 10-75 mass % of clay mineral, characterized in that the content of sodium and potassium therein is 0.5 mass % or lower in terms of oxide ($Na_2O$ and $K_2O$) amount, the content of at least a rare earth metal therein is 3.0 mass % or lower in terms of oxide ($RE_2O_3$, wherein RE is a rare earth element) amount, the $[RE_2O_3+Na_2O+K_2O]/$[crystalline aluminosilicate] ratio by mass is 0.1 or lower, and the catalyst has a xenon adsorption amount, as measured at an adsorption temperature of 25° C. and a partial xenon pressure of 650 torr, of $2.20 \times 10^{20}$ molecules or more per g of the catalyst.

(2) A process for producing the catalyst for catalytic cracking of a hydrocarbon oil as described under (1) above, characterized by spray-drying an aqueous slurry containing a crystalline aluminosilicate, a binder, and a clay mineral and then washing the resultant particles by ion exchange to remove sodium and potassium so that the content of sodium and potassium becomes 0.5% by mass or lower in terms of oxide ($Na_2O$ and $K_2O$) amount.

(3) A method of catalytic cracking of a hydrocarbon oil characterized by catalytically cracking a hydrocarbon oil using the catalyst for catalytic cracking of a hydrocarbon oil as described under (1) above.

Advantages of the Invention

The catalytic cracking catalyst of the invention has high cracking activity in the catalytic cracking reaction of a hydrocarbon oil and enables a gasoline having higher octane number to be efficiently obtained without decreasing a gasoline yield. In general, even a slight improvement in the cracking activity of a catalyst in an FCC process can reduce the cost of the FCC unit and the load to be imposed thereon due to the property of the process. Furthermore, FCC gasoline is incorporated generally in large quantities into gasolines to be shipped to the market and an octane number improvement in FCC gasoline will make an enormous profit.

Namely, since the catalytic cracking catalyst of the invention has high cracking activity to enable the catalytic cracking of a hydrocarbon oil to be satisfactorily conducted and enables FCC gasoline having a high octane number to be obtained without decreasing a gasoline yield as stated above, it is exceedingly effective practically.

BRIEF DESCRIPTION OF THE DRAWING

FIG. 1 is showing a correlation between xenon adsorption pressure (P) and xenon adsorption amount (N) in catalyst A of Example 1.

BEST MODE FOR CARRYING OUT THE INVENTION

Embodiments of the invention will be explained below in detail.

<Crystalline Aluminosilicate>

The crystalline aluminosilicate to be used as a catalyst component in the invention may be a ultra stable Y zeolite. The ultra stable Y zeolite can be synthesized from Y zeolite as a starting material. Compared to Y zeolite, ultra stable Y zeolite is resistant to deterioration in crystallinity. In general, ultra stable Y zeolites are obtained by subjecting Y zeolite to a high-temperature steam treatment several times and then optionally treating the zeolite with a mineral acid, e.g., hydrochloric acid, a base, e.g., sodium hydroxide, a salt, e.g., calcium fluoride, or a chelating agent, e.g., ethylenediaminetetraacetic acid. A ultra stable Y zeolite obtained by this technique can be used in the form which has undergone ion exchange with a cation selected from hydrogen, ammonium, and polyvalent metals. It is also possible to use a heat-shock crystalline aluminosilicate zeolite having better stability (see Japanese Patent No. 2544317).

The ultra stable Y zeolite to be used as a catalyst component in the invention preferably is one in which (a) the $SiO_2/Al_2O_3$ molar ratio in the bulk as determined by composition-determining chemical analysis is 4-15, preferably 5-10, (b) the unit cell size is 24.35-24.65 Å, preferably 24.40-24.60 Å, and (c) the molar ratio of the framework aluminum to all aluminum in the zeolite is 0.3-1.0, preferably 0.4-1.0. This ultra stable Y zeolite has basically the same crystal structure as natural faujasite and has a composition, in terms of oxide composition, represented by the following equation formula (I).

$$(0.02-1.0)R_{2/m}O \cdot Al_2O_3 \cdot (5-11)SiO_2 \cdot (5-8)H_2O \quad \text{equation (I)}$$

R: ion of Na, K, or another alkali metal or ion of alkaline earth metal
m: valence of R The unit cell size in the invention can be measured with an X-ray diffractometer (XRD). The molar number of the framework aluminum to all aluminum in the zeolite is a value calculated from the $SiO_2/Al_2O_3$ ratio determined by composition-determining chemical analysis and from the unit cell size using the following equations (A) to (C).

Incidentally, equation (A) is one described in H. K. Beyer et al., *J. Chem. Soc., Faraday Trans.* 1, (81), 2899 (1985).

$$N_{Al}=(a_0-2.425)/0.000868 \quad \text{equation (A)}$$

$a_0$: unit cell size/nm
$N_{Al}$: number of Al atoms per unit cell
2.425: unit cell size as measured after all Al atoms in the unit cell have been eliminated from the framework
0.000868: calculated value determined through experiment; it indicates the slope of a linear equation ($a_0=0.000868N_{Al}+2.425$) obtained by arranging $a_0$ and $N_{Al}$ $$(Si/Al) \text{ calculation formula}=(192-N_{Al})/N_{Al} \quad \text{equation (B)}$$

192: number of atoms of (Si+Al) per unit cell of Y zeolite
$N_{Al}$: number of Al atoms per unit cell $$\text{Al framework/all Al}=[\text{value of (Si/Al) by composition-determining chemical analysis}]/[(Si/Al) \text{ calculation formula}] \quad \text{equation (C)}$$

When the zeolite has an $SiO_2/Al_2O_3$ molar ratio of from 4 to 15, it is suitable to obtain cracking activity of heavy a hydrocarbon oil.

The unit cell size of the zeolite indicates the size of each of the units constituting the zeolite. When it is 24.35 Å or larger, the zeolite has an appropriate number of aluminum atoms necessary for heavy-oil cracking and this enables the cracking to proceed satisfactorily. When the unit cell size is 24.65 Å or smaller, it is easy to prevent the zeolite crystals from deteriorating and a considerable decrease in the cracking activity of the catalyst can be avoided.

In case where the amount of the aluminum as a component of the zeolite crystals is too large, the zeolite includes a larger amount of $Al_2O_3$ particles which have separated from the zeolite framework, resulting in a possibility that this zeolite might have no strong-acid sites and hence become unable to cause catalytic cracking reactions to proceed. When the molar ratio of the framework aluminum to all aluminum in the zeolite is 0.3 or higher, that phenomenon can be avoided. When the molar ratio of the framework aluminum to all aluminum in the zeolite is close to 1, this means that most of the aluminum in the zeolite has been incorporated in the unit zeolite cell. This is preferred because the aluminum in the zeolite contributes to the formation of strong-acid sites.

<Binder>

The binder to be used as a catalyst component in the invention may be a silica binder, alumina binder, or the like. These binders are present among particles of the crystalline aluminosilicate, clay mineral, etc., and are used for the purpose of improving moldability required for the formation of catalyst particles and thereby obtain spherical catalyst particles improved in fluid and attrition resistance.

Several kinds are known as the silica binder. In the case of colloidal silica, for example, there are silica sols such as the sodium type, lithium type, and acid type. Any of these types can be used in the invention. From the standpoint of producing the catalytic cracking catalyst on a commercial scale, use may be made of a silica hydrosol obtained by reacting a diluted aqueous solution of sodium silicate with an aqueous solution of sulfuric acid.

As the alumina binder, a solution prepared by dissolving gibbsite, bialite, boehmite, bentonite, crystalline alumina, or the like in an acid solution; a solution prepared by dispersing a boehmite gel or amorphous alumina gel in an aqueous solution; or an alumina sol can be used.

A mixture of a silica binder and an alumina binder may be used as long as this does not lessen the effects to be produced by the catalyst.

<Clay Mineral>

The clay mineral to be used as a catalyst component in the invention may be a clay mineral such as, e.g., montmorillonite, kaolinite, halloysite, bentonite, attapulgite, or bauxite. These clay minerals may be used in combination with fine particles of a known inorganic oxide for use in ordinary cracking catalysts, such as silica, silica-alumina, alumina, silica-magnesia, alumina-magnesia, phosphorus-alumina, silica-zirconia, or silica-magnesia-alumina.

<Composition and Preparation of Catalyst>

The catalytic cracking catalyst of the invention, which includes the ingredients described above, can be prepared by various techniques. Examples thereof include the following procedure.

First, a crystalline aluminosilicate, a binder, and a clay mineral are mixed together in a mixing vessel to obtain a homogenous aqueous slurry. The contents of the crystalline aluminosilicate, binder, and clay mineral to be mixed in this step are in the following ranges: the content of the crystalline aluminosilicate is 20-50 mass %, preferably 35-45 mass %, that of the binder is 5-40 mass %, preferably 10-35 mass %, and that of the clay mineral is 10-75 mass %, preferably 15-70 mass %, each based on the catalyst on a dry basis.

When the amount of the crystalline aluminosilicate is 20 mass % or larger, the desired cracking activity can be obtained. When the amount thereof is 50 mass % or smaller, the trouble that the relative amounts of the clay mineral and binder are excessively small to arouse the following undesirable phenomenon can be avoided. Namely, in case where the amounts of the clay mineral and binder are too small, the catalyst not only is reduced in strength but has a reduced bulk density and this leads to undesirable results in unit operation.

When the amount of the binder is 5 mass % or larger, the catalyst can retain a strength and, hence, undesirable phenomena such as catalyst scattering, catalyst inclusion into the product oil, etc. can be avoided. When the amount thereof is 40 mass % or smaller, catalyst performances are improved according to the amount of the binder used and this is economically advantageous.

Furthermore, when the amount of the clay mineral is 10% by mass or larger, it is possible to avoid the trouble that the catalyst is low in strength and bulk density to raise difficulties in unit operation. When the amount thereof is 75 mass % or smaller, the amounts of the crystalline aluminosilicate and binder can be prevented from becoming relatively small. Consequently, the trouble that the desired high cracking activity cannot be obtained due to a deficiency in the amount of the crystalline aluminosilicate and the trouble that catalyst preparation is difficult due to a deficiency in binder amount can be avoided.

The solid content of the aqueous slurry prepared by mixing the ingredients described above is preferably about 5-60 mass %, more preferably about 10-50 mass %. When the solid content is within that range, the amount of water to be evaporated is appropriate and this slurry does not raise a difficulty in a spray drying step, etc. In addition, such slurry is free from the trouble that it has too high a viscosity and is difficult to transport.

Subsequently, the aqueous slurry is usually spray-dried to obtain microspheres (catalyst or catalyst precursor). This spray drying is preferably conducted with a spray dryer at a gas inlet temperature of about 200-600° C. and a gas outlet temperature of about 100-500° C. The spray-dried catalyst particles preferably have a particle diameter of about 20-150 μm and a water content of about 10-30% by mass.

The microspheres obtained by spray-drying the aqueous slurry may be calcined at 200° C. or higher according to need to obtain a calcined product. In the case where the equipment for spray-drying the aqueous slurry with a spray dryer includes an apparatus capable for maintaining a gas outlet temperature of 200° C. or higher, it is possible to incorporate the calcination step of the microspheres into the spray drying step.

<Cleaning of Catalyst>

The microspheres thus obtained or calcined product obtained therefrom is usually cleaned by ion exchanges to remove the sodium and potassium which are alkali metals which have come into the catalyst via the ingredients for the catalyst, i.e., the crystalline aluminosilicate, binder, and clay mineral. The microspheres or calcined product is then dried to obtain the catalyst of the invention. In the case where the microspheres obtained or the calcined product obtained therefrom contains neither excess sodium nor excess potassium, the microspheres or calcined product may be used as a catalyst without undergoing any treatment.

The removal of sodium and potassium by, for example, ion exchange using an aqueous solution of an ammonium salt such as ammonium sulfate, ammonium sulfite, ammonium hydrogen sulfate, ammonium hydrogen sulfite, ammonium thiosulfate, ammonium nitrite, ammonium nitrate, ammonium phosphinate, ammonium phosphonate, ammonium phosphate, ammonium hydrogen phosphate, ammonium dihydrogen phosphate, ammonium carbonate, ammonium hydrogen carbonate, ammonium chloride, ammonium bromide, ammonium iodide, ammonium formate, ammonium acetate, or ammonium oxalate can be accomplished. For example, the microspheres or the calcined product obtained therefrom is immersed in an aqueous solution of any of those ammonium salts for 1-100 minutes at 10-70° C. to conduct ion exchange, whereby the microspheres or calcined product can be cleaned. This ion exchange can diminish alkali metals, such as sodium and potassium, remaining in the microspheres or calcined product obtained therefrom.

The content of sodium and potassium in the catalyst thus obtained, which is the microspheres or the calcined product obtained therefrom, has been regulated so as to be 0.5 mass % or lower, preferably 0.35 mass % or lower, in terms of oxide ($Na_2O$ and $K_2O$) amount.

Contents of $Na_2O$ and $K_2O$ not higher than 0.5 mass % are suitable because the amount of alkali metals, such as sodium and potassium, remaining in the catalyst is adequate and solid acidity can be prevented from being neutralized by residual alkali metals. As a result, the catalyst can retain high cracking activity.

After the cleaning for removing alkali metals such as sodium and potassium, the catalyst in the form of microspheres or of a calcined product obtained therefrom may be washed with distilled water or ion-exchanged water as is well known to persons skilled in the art.

After the washing operation, the microspheres or calcined product for use as a catalyst may be dried at a temperature of about 100-500° C. to reduce the water content thereof to about 1-25 mass % and thereby obtain a catalyst applicable to the invention.

<Containment of Rare Earth Metal>

The catalytic cracking catalyst of the invention can contain at least one rare earth metal according to need. The content of the at least one rare earth metal therein is 3.0 mass % or lower, preferably 1.2 mass % or lower, in terms of oxide ($RE_2O_3$, wherein RE is a rare earth element) amount. One or more kinds of rare earth metals selected from scandium, yttrium, lanthanum, cerium, praseodymium, neodymium, samarium, gadolinium, dysprosium, holmium, etc. can be incorporated. Preferred are lanthanum and cerium. The incorporation of at least one rare earth metal can inhibit the zeolite crystals from collapsing to thereby heighten durability of the catalyst.

Methods for incorporating a rare earth metal into the catalyst of the invention are not particularly limited, and any of ordinary methods for catalyst preparation may be suitably employed.

For example, one method for incorporating a rare earth metal into the catalyst is to subject the catalyst, which is the microspheres or calcined product thereof cleaned for alkali metal removal, to ion exchange with a rare earth metal to thereby incorporate the rare earth metal into the catalyst.

Another method comprises loading a rare earth metal on a crystalline aluminosilicate which is one of the catalyst components to obtain a so-called metal-modified crystalline aluminosilicate and adding a binder and a clay mineral as other catalyst components to the metal-modified crystalline aluminosilicate to prepare a catalyst. In the case where this metal-modified crystalline aluminosilicate is used, the desired catalyst can be obtained in the same preparation as in the case described above in which an unmodified crystalline aluminosilicate is used. Namely, the target catalyst can be obtained by preparing a slurry using the metal-modified crystalline aluminosilicate together with a binder and a clay mineral, subsequently spray-drying the slurry to obtain microspheres, optionally calcining the microspheres to obtain a calcined product, and then conducting cleaning for alkali metal removal.

Either of those methods for incorporating a rare earth metal into the catalyst can be conducted by ordinary techniques for catalyst preparation. For example, the ion exchange and the loading each can be accomplished by a technique in which an aqueous solution containing one or more of compounds, e.g., the chlorides, nitrates, sulfates, and acetates, of rare earth metals, e.g., lanthanum and cerium, is subjected to ion exchange with or infiltration into the catalyst or a crystalline aluminosilicate, which is one catalyst component, each in a dry or wet state and the catalyst or aluminosilicate thus treated is then heated according to need.

Metals other than rare earth metals may be incorporated into the catalyst of the invention as long as the desired effects of the invention are obtained.

<$[RE_2O_3+Na_2O+K_2O]$/[Crystalline Aluminosilicate] Mass Ratio>

In the catalytic cracking catalyst of the invention, the ratio by mass of the sum of the content of the rare earth metal in terms of oxide ($RE_2O_3$) amount and the content of sodium and potassium in terms of oxide ($Na_2O$ and $K_2O$) amount [$RE_2O_3+Na_2O+K_2O$] to the content of the crystalline aluminosilicate [crystalline aluminosilicate], (i.e., [$RE_2O_3+Na_2O+K_2O$]/[crystalline aluminosilicate] mass ratio), has been regulated to 0.1 or lower, preferably 0.05 or lower. To regulate the value of that mass ratio to 0.1 or lower can be accomplished, for example, by controlling the ion exchange with the rare earth metal, the rare-earth content in the case of using the metal-modified crystalline aluminosilicate, the ion exchange with an aqueous solution of an ammonium salt, etc. among the catalyst preparation conditions described above. When that mass ratio is 0.1 or lower, the amount of the alkali metals and rare earth metal with which the crystalline aluminosilicate is coated is adequate and solid-acid sites, which are necessary for catalytic cracking reactions, can be exposed. This catalyst can lead cracking reactions to proceed satisfactorily.

<Xenon Adsorption Amount of the Catalyst>

The catalytic cracking catalyst thus obtained has micro pores and hence has the ability to adsorb molecules of gases such as nitrogen ($N_2$), helium (He), and xenon (Xe). The amount of adsorption of xenon, in particular, can be determined in the following manner.

First, the catalyst is preferably subjected to a pretreatment in which about 1 g of the catalyst is weighted out and vacuum-degassed at about 400-500° C. at a vacuum of $10^{-4}$ torr ($10^{-4}$ torr=$10^{-4} \times 133.322$ Pa) or higher to remove the water adsorbed on the catalyst. The time period of the vacuum-degassing is preferably 3 hours or longer from the standpoint of bringing the catalyst into a dry state.

The catalyst sample which has undergone the degassing treatment is then subjected to a measurement of xenon adsorption amount. The measurement is preferably conducted at ambient temperature, i.e., 25° C. From the standpoint of obtaining measured values having a higher accuracy, it is preferred to make the measurement at eight different xenon adsorption pressures in the range of 5-660 torr. Xenon adsorption amount can be obtained by the constant-volume method by dividing a change in xenon pressure through adsorption, i.e., a pressure change through xenon adsorption, by the dead volume (volume of the tube space into which the sample has been introduced). When the xenon adsorption pressure and xenon adsorption amount are expressed by P and N, respectively, the following correlational expression holds. The xenon adsorption amount at an arbitrary xenon pressure can be calculated using the equation.

$$\text{Log } N = a \times \text{Log } P + b$$

a, b: constants determined with regression equation
P: xenon adsorption pressure/torr
N: xenon adsorption amount per g-catalyst/molecules In the catalytic cracking catalyst of the invention, it is crucial that the xenon adsorption amount (N) at 25° C. as calculated for a xenon pressure of 650 torr should be $2.20 \times 10^{20}$ molecules or larger, preferably $2.35 \times 10^{20}$ molecules or larger, per g of the catalyst. In case where the catalytic cracking catalyst does not satisfy this requirement concerning xenon adsorption amount (N), it cannot have the desired high cracking activity and yield FCC gasoline having a high octane number.

Although a theoretical ground for that effect has not been fully elucidated, the following is thought. The crystalline aluminosilicate to be used in the invention is required to have the ability to accelerate the cracking reactions of hydrocarbons, i.e., to have solid acidity for breaking carbon-carbon bonds. The higher the solid acidity, the higher the ratio of high-octane olefins in the gasoline. On the other hand, xenon is capable of being adsorbed only in small pores larger than 0.44 nm because of the atomic diameter thereof. In addition, xenon is present as electron-rich monoatomic molecules and hence has the property of being selectively adsorbed onto adsorption sites having high solid acidity. Consequently, the amount of xenon adsorbed is thought to indicate the number of strong-acid sites in the catalyst which accelerate cracking reactions and yield a large amount of olefins having a high octane number. It is presumed that a catalyst having a xenon adsorption amount not smaller than a certain value has the desired high cracking activity. It is further presumed that to diminish sodium and potassium, which are alkali metals neutralizing solid acidity, results in a larger amount of solid-acid sites exposed in the catalyst surface and enables olefins having a high octane number to be yielded in a large amount.

To enable the catalyst to satisfy the requirement concerning xenon adsorption amount (N) can be accomplished by suitably regulating/controlling the conditions of each catalyst preparation step so that the $[RE_2O_3+Na_2O+K_2O]/[$crystalline aluminosilicate] ratio by mass in the resultant catalyst is a proper value not larger than 0.1.

<Method of Catalytic Cracking>

Catalytic hydrocarbon oil cracking with the catalyst of the invention may be accomplished by bringing a hydrocarbon oil (hydrocarbon mixture) which boils at temperatures not lower than the boiling points of gasolines into contact with the catalyst of the invention. The hydrocarbon mixture which boils at temperatures not lower than the boiling points of gasolines means any of a gas oil fraction, atmospheric distillation residues, and vacuum distillation residues obtained by the atmospheric or vacuum distillation of a crude oil. That term, of course, includes coker gas oil, solvent-deasphalated oil, asphalt resulting from solvent deasphalting, tar sand oil, shale oil, and coal liquefaction oil. Furthermore, it is a matter of course that these hydrocarbon oil may be subjected to hydrotreating known to persons skilled in the art. Namely, a hydrotreated oil obtained by subjecting a hydrocarbon oil to hydrodesulfurization at a high temperature and a high pressure in the presence of a hydrotreating catalyst such as an Ni—Mo catalyst, Co—Mo catalyst, Ni—Co—Mo catalyst, or Ni—W catalyst is also usable as a feed to be catalytically cracked.

Commercial-scale catalytic cracking is usually conducted while continuously circulating the catalyst of the invention described above through a catalytic cracking unit (FCC unit) comprising two vessels, i.e., a vertically installed cracking reactor and a catalyst regenerator. Namely, the hot regenerated catalyst discharged from the catalyst regenerator is mixed with a hydrocarbon feed to be cracked and this mixture is caused to ascend through the cracking reactor. The catalyst which has been deactivated by the coke deposited on the catalyst as a result of the cracking is separated from the cracking products, subjected to stripping, and then transferred to the catalyst regenerator. The deactivated catalyst transferred to the catalyst regenerator is regenerated by removing the coke on the catalyst through burning in air and is then circulated again to the cracking reactor. On the other hand, the cracking products are separated into dry gas, LPG, gasoline fraction, LCO, and one or more heavy fractions such as HCO or slurry oil. It is a matter of course that part or all of the LCO and heavy fractions such as HCO and slurry oil separated from the cracking products may be recirculated to the cracking reactor and led to further undergo cracking reaction.

Adequate operating conditions for the cracking reactor in the FCC unit in this operation include a reaction temperature of about 400-600° C., preferably about 450-550° C., a reaction pressure of from normal pressure to 5 kg/cm$^2$, preferably from normal pressure to 3 kg/cm$^2$, and a catalyst/hydrocarbon feed mass ratio of about 2-20, preferably about 4-15.

When the reaction temperature is 400° C. or higher, the cracking reaction of the hydrocarbon feed proceeds satisfactorily and cracking products can be satisfactorily obtained. When the reaction temperature is 600° C. or lower, the amount of light gases such as dry gas and LPG to be yielded by the cracking can be reduced and the relative yield of the target gasoline fraction can be increased. Such a temperature is hence economical.

When the pressure is 5 kg/cm$^2$ or lower, the progress of the cracking, which is a reaction resulting in an increase in the number of moles, is less apt to be inhibited. When the catalyst/hydrocarbon feed mass ratio is 2 or higher, the catalyst concentration in the cracking reactor can be kept at an adequate value, whereby the cracking of the hydrocarbon feed proceeds satisfactorily. Furthermore, when that ratio is 20 or lower, it is possible to avoid the trouble that the effect of using a heightened catalyst concentration is saturated and a result compensating for the heightened catalyst concentration is not obtained disadvantageously.

Example 1

The invention will be explained below by reference to Examples. However, the following Examples are given as mere examples and the invention should not be construed as being limited by the Examples in any way.

Example 1

Preparation of Catalyst A

Catalyst A was prepared in the following procedure using a ultra stable Y zeolite having the properties shown in Table 1 as a crystalline aluminosilicate, an aqueous solution of sodium silicate (JIS No. 3 sodium silicate; 28.9 mass % SiO$_2$) as a binder, kaolinite as a clay mineral, and a hydrated aluminum oxide (trade name, Pural SB; manufactured by Sasol) having a pseudo-boehmite structure as a catalyst additive.

A solution prepared by mixing 138 g of an aqueous solution of sodium silicate and distilled water was added dropwise to diluted sulfuric acid to prepare an aqueous silica sol solution (10.2 mass % SiO$_2$). On the other hand, distilled water was added to 76.0 g (on dry basis) of the ultra stable Y zeolite having the properties shown in Table 1 to prepare a zeolite slurry. To the aqueous silica sol solution were added 73.4 g (on dry basis) of kaolinite and 10.0 g (on dry basis) of the hydrated aluminum oxide. These ingredients were mixed together, and the zeolite slurry was added thereto. The ingredients were mixed together for further 5 minutes. The aqueous slurry obtained was spray-dried under the conditions of an inlet temperature of 210° C. and an outlet temperature of 140° C. to obtain microspheres as a catalyst precursor. This catalyst precursor was subjected twice to ion exchange with 3 L of 5% by mass aqueous ammonium sulfate solution having a temperature of 60° C. and then washed with 3 L of distilled water. Subsequently, the microspheres washed were subjected to 15-minute ion exchange with an aqueous lanthanum nitrate solution so as to result in a lanthanum oxide content of 0.3% by mass on a dry basis and then washed with 3 L of distilled water. Thereafter, the microspheres were dried in a dryer at 110° C. overnight to obtain catalyst A.

TABLE 1

| | |
|---|---|
| Silica-alumina ratio (molar ratio) | 7 |
| Unit cell size (Å) | 24.55 |
| Al in framework/all Al (molar ratio) | 0.77 |

<Measurement of Xenon Adsorption Amount>

A sample pretreatment was conducted in which about 1 g of the catalyst was weighed out and vacuum-degassed at a temperature of 400° C. and a vacuum of $10^{-4}$ torr for 3 hours.

The sample which had been vacuum-degassed was examined at ambient temperature, i.e., 25° C., at eight different xenon adsorption pressures in the range of 5-660 torr. Xenon adsorption amounts were calculated by the constant-volume method from xenon pressure changes through adsorption (see FIG. 1). The data obtained through the measurement were plotted, with the xenon adsorption pressure and the xenon adsorption amount expressed by P and N, respectively. From the correlation equation thus obtained (Log N=a×Log P+b (wherein a and b are constants)), the xenon adsorption amount (N) at a xenon adsorption pressure of 650 torr was found to be $2.52 \times 10^{20}$ molecules per g.

Example 2

A ultra stable Y zeolite having the properties shown in Table 2 was used as a crystalline aluminosilicate.

TABLE 2

| Silica-alumina ratio (molar ratio) | 7 |
| Unit cell size (Å) | 24.42 |
| Al in framework/all Al (molar ratio) | 0.4 |

Catalyst B was prepared in the same procedure as in Example 1, except that the crystalline aluminosilicate described in Table 2 was used, the amount of the kaolinite to be mixed was changed to 73.0 g (on dry basis), and the ion exchange with lanthanum was conducted so as to result in a lanthanum oxide content of 0.5 mass % on a dry basis.

Catalyst B was examined for xenon adsorption amount in the same procedure as in Example 1. The xenon adsorption amount (N) at a xenon adsorption pressure of 650 torr, as calculated from the results, was $2.46 \times 10^{20}$ molecules per g.

Example 3

A ultra stable Y zeolite having the properties shown in Table 2 was used as a crystalline aluminosilicate.

Catalyst C was prepared in the same procedure as in Example 1, except that the amount of the ultra stable Y zeolite was changed from 76.0 g (on dry basis) to 80.0 g (on dry basis), that of the kaolinite was changed from 73.4 g (on dry basis) to 67.6 g (on dry basis), and the ion exchange with lanthanum was conducted so as to result in a lanthanum oxide content of 1.2 mass % on a dry basis.

Catalyst C was examined for xenon adsorption amount in the same procedure as in Example 1. The xenon adsorption amount (N) at a xenon adsorption pressure of 650 torr, as calculated from the results, was $2.35 \times 10^{20}$ molecules per g.

Example 4

Catalyst D was prepared in the same procedure as in Example 1, except that the amount of the ultra stable Y zeolite was changed from 76.0 g (on dry basis) to 64.0 g (on dry basis), that of the kaolinite was changed from 73.4 g (on dry basis) to 86.0 g (on dry basis), and the ion exchange with lanthanum nitrate was omitted.

Catalyst D was examined for xenon adsorption amount in the same procedure as in Example 1. The xenon adsorption amount (N) at a xenon adsorption pressure of 650 torr, as calculated from the results, was $2.32 \times 10^{20}$ molecules per g.

Comparative Example 1

Catalyst E was prepared in the same procedure as in Example 1, except that the amount of the ultra stable Y zeolite was changed from 76.0 g (on dry basis) to 64.0 g (on dry basis), that of the kaolinite was changed from 73.4 g (on dry basis) to 83.6 g (on dry basis), and the ion exchange with lanthanum was conducted so as to result in a lanthanum oxide content of 1.2 mass % on a dry basis.

Catalyst E was examined for xenon adsorption amount in the same procedure as in Example 1. The xenon adsorption amount (N) at a xenon adsorption pressure of 650 torr, as calculated from the results, was $2.13 \times 10^{20}$ molecules per g.

Comparative Example 2

Catalyst F was prepared in the same procedure as in Example 1, except that the amount of the kaolinite was changed from 73.4 g (on dry basis) to 71.0 g (on dry basis), and the ion exchange with lanthanum was conducted so as to result in a lanthanum oxide content of 1.5 mass % on a dry basis.

Catalyst F was examined for xenon adsorption amount in the same procedure as in Example 1. The xenon adsorption amount (N) at a xenon adsorption pressure of 650 torr, as calculated from the results, was $2.18 \times 10^{20}$ molecules per g.

Comparative Example 3

Catalyst G was prepared in the same procedure as in Example 1, except that the amount of the ultra stable Y zeolite was changed from 76.0 g (on dry basis) to 30.0 g (on dry basis), that of the kaolinite was changed from 73.4 g (on dry basis) to 90.0 g (on dry basis), that of the hydrated aluminum oxide was changed from 10.0 g (on dry basis) to 40.0 g (on dry basis), and the ion exchange with lanthanum nitrate was omitted.

Catalyst G was examined for xenon adsorption amount in the same procedure as in Example 1. The xenon adsorption amount (N) at a xenon adsorption pressure of 650 torr, as calculated from the results, was $1.50 \times 10^{20}$ molecules per g.

Comparative Example 4

Catalyst H was prepared in the same procedure as in Example 1, except that the ion exchange with 60° C. 5 mass % aqueous ammonium sulfate solution was omitted. Thus, catalyst H was obtained.

Catalyst H was examined for xenon adsorption amount in the same procedure as in Example 1. The xenon adsorption amount (N) at a xenon adsorption pressure of 650 torr, as calculated from the results, was $2.22 \times 10^{20}$ molecules per g.

<List of Catalysts>

The compositions of the catalysts obtained in the Examples and Comparative Examples given above are summarized in Table 3. The content of $Na_2O$ and $K_2O$ in each catalyst obtained was determined with an ICP spectrometer (IRIS Advantage, manufactured by Nippon Jarrell-Ash Co., Ltd.).

TABLE 3

| | Example/Comparative Example | | | | | | | |
|---|---|---|---|---|---|---|---|---|
| | Example 1 | Example 2 | Example 3 | Example 4 | Comparative Example 1 | Comparative Example 2 | Comparative Example 3 | Comparative Example 4 |
| Catalyst name | A | B | C | D | E | F | G | H |
| Crystalline aluminosilicate | | | | | | | | |
| $SiO_2/Al_2O_3$ (molar ratio) | 7 | 7 | 7 | 7 | 7 | 7 | 7 | 7 |
| Unit cell size (Å) | 24.55 | 24.42 | 24.42 | 24.55 | 24.55 | 24.55 | 24.55 | 24.55 |
| Al in framework/all Al (molar ratio) | 0.77 | 0.4 | 0.4 | 0.77 | 0.77 | 0.77 | 0.77 | 0.77 |
| Catalyst composition (mass %, dry basis) | | | | | | | | |
| Crystalline aluminosilicate | 38 | 38 | 40 | 32 | 32 | 38 | 15 | 38 |
| Binder | 20 | 20 | 20 | 20 | 20 | 20 | 20 | 20 |
| Clay mineral | 36.38 | 36.18 | 33.47 | 42.77 | 41.59 | 35.2 | 44.77 | 36.15 |
| Alumina | 5 | 5 | 5 | 5 | 5 | 5 | 20 | 5 |
| Lanthanum oxide | 0.3 | 0.5 | 1.2 | none | 1.2 | 1.5 | none | 0.3 |
| $Na_2O$ | 0.32 | 0.32 | 0.33 | 0.23 | 0.21 | 0.3 | 0.23 | 0.55 |
| $K_2O$ | 0.01 | 0.01 | 0.01 | 0.02 | 0.02 | 0.01 | 0.02 | 0.01 |
| Xe adsorption amount ($\times 10^{20}$ molecules per g) | 2.52 | 2.46 | 2.35 | 2.32 | 2.13 | 2.18 | 1.5 | 2.22 |
| $[RE_2O_3 + Na_2O + K_2O]/$ [crystalline aluminosilicate] mass ratio | 0.02 | 0.02 | 0.04 | 0.01 | 0.04 | 0.05 | 0.02 | 0.02 |

<Fluid Catalytic Cracking with the Catalysts Prepared>

With respect to each of the catalysts prepared in Examples 1 to 4 and Comparative Examples 1 to 4 given above, the catalytic cracking reaction of a feed was carried out in a fluid bed bench-scale catalytic cracking unit comprising a reactor and a catalyst regenerator. The feed used was a desulfurized vacuum-distillation gas oil/atmospheric-distillation residue mixture containing 90 mass % heavy fraction vaporized at 353° C. or higher.

Prior to the test, each catalyst was treated in the following procedure for the purpose of an approximation to an actual use state, i.e., equilibration. Each catalyst was dried at 500° C. for 5 hours, subsequently impregnated with a cyclohexane solution containing nickel naphthenate and vanadium naphthenate so as to result in a nickel content and a vanadium content of 1,000 ppm by mass and 2,000 ppm by mass, respectively, drying the catalyst, calcining it at 500° C. for 5 hours, and then treating the catalyst with a 100% steam atmosphere at 785° C. for 6 hours.

Subsequently, each catalyst in the state approximating to an actual use state was used to conduct the cracking reaction under the reaction conditions shown in Table 4.

TABLE 4

| | |
|---|---|
| Catalyst/feed mass ratio | 6-12 |
| Reaction temperature (° C.) | 510 |
| Catalyst regeneration temperature (° C.) | 650 |
| Catalyst circulation amount (g/min) | 60 |

The cracked products was analyzed with AC Sumdis Analyzer, manufactured by Agilent Technologies, by the gas chromatography-distillation method to determine the amounts of a gasoline (25-190° C.), LCO (190-350° C.), and HCO (350° C. and higher). The octane number of the gasoline was determined with a PONA analyzer manufactured by Hewlett-Packard Co., by GC-RON based on gas chromatography. The results thereof were graphed, and the catalyst/feed ratio (mass ratio) resulting in a conversion of 65% by mass was calculated from the graph (not shown) by regressive calculation. The conversion herein means the value of 100−(LCO/mass %)−(HCO/mass %). Furthermore, the values of hydrogen, coke, gasoline, etc. corresponding to the value of catalyst/feed ratio (mass ratio) were calculated. Table 5 shows the conversion (cracking activity) at a catalyst/feed ratio of 8.0 and the yield and octane number (GC-RON) of the gasoline as calculated at a conversion of 65 mass %.

TABLE 5

| | Example/Comparative Example | | | | | | |
|---|---|---|---|---|---|---|---|
| | Example 1 | Example 2 | Example 3 | Example 4 | Comparative Example 1 | Comparative Example 2 | Comparative Example 3 |
| Catalyst name | A | B | C | D | E | F | G |
| Conversion at catalyst/feed ratio of 8.0 (mass %) | 66.7 | 67.2 | 68.1 | 66.3 | 67.1 | 68 | 65 |
| Yield of FCC gasoline at Conversion of 65% (mass %) | 46.3 | 46.3 | 47.1 | 46.1 | 46.8 | 47 | 45.3 |
| Octane number of FCC gasoline at conversion of 65% (GC-RON) | 90.6 | 90.3 | 89.5 | 90.7 | 88.6 | 88.4 | 88.7 |

The results of table 5 show that in Comparative Examples 1 and 2, which are outside the scope of the invention, the catalysts are low in octane number although high in cracking activity, and are unable to produce the effects of the invention. In Comparative Examples 3 and 4, which are outside the scope of the invention, the catalysts are low in both cracking activity and octane number and are hence disadvantageous.

In contrast, in Examples 1 to 4 according to the invention, the catalysts can retain high cracking activity and can yield FCC gasoline having a high octane number. Furthermore, it is apparent that when the FCC gasoline obtained in each of Examples 1 to 4 according to the invention is used for gasoline composition preparation, a gasoline composition can be advantageously prepared.

The invention claimed is:

1. A catalyst for catalytic cracking of a hydrocarbon oil, which consists of 20-50 mass % of a crystalline aluminosilicate, 5-40 mass % of a binder, and 10-75 mass % of a clay mineral, wherein the content of sodium and potassium therein is 0.5% by mass or lower in terms of oxide ($Na_2O$ and $K_2O$) amount, the content of at least one rare earth metal therein is 3.0% by mass or lower in terms of oxide ($RE_2O_3$, wherein RE is a rare earth element) amount, the [$RE_2O_3$+$Na_2O$+$K_2O$]/[crystalline aluminosilicate] mass ratio is 0.1 or lower, and the catalyst has a xenon adsorption amount, as measured at an adsorption temperature of 25° C. and a partial xenon pressure of 650 torr, of $2.20 \times 10^{20}$ molecules or more per g of the catalyst.

2. A process for producing the catalyst for catalytic cracking of a hydrocarbon oil according to claim 1, characterized by spray-drying an aqueous slurry containing a crystalline aluminosilicate, a binder, and a clay mineral and then washing the resultant particles by ion exchange to remove sodium and potassium so that the content of sodium and potassium becomes 0.5% by mass or lower in terms of oxide ($Na_2O$ and $K_2O$) amount.

3. A method of catalytic cracking of a hydrocarbon oil, characterized by catalytically cracking a hydrocarbon oil using the catalyst for catalytic cracking of a hydrocarbon oil according to claim 1.

* * * * *